(12) United States Patent
Bashor

(10) Patent No.: US 8,597,704 B2
(45) Date of Patent: *Dec. 3, 2013

(54) HIGH FIBER PASTRY PRODUCT

(75) Inventor: Michael Bashor, St. Louis Park, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,021

(22) Filed: Mar. 30, 2012

(65) Prior Publication Data

US 2012/0183652 A1 Jul. 19, 2012

Related U.S. Application Data

(63) Continuation of application No. 12/430,924, filed on Apr. 28, 2009, now Pat. No. 8,168,244.

(60) Provisional application No. 61/126,122, filed on May 1, 2008.

(51) Int. Cl.
*A21D 13/00* (2006.01)

(52) U.S. Cl.
USPC ............. 426/94; 426/496; 426/549; 426/551; 426/556

(58) Field of Classification Search
USPC .............................. 426/94, 496, 549, 551, 556
See application file for complete search history.

(56) References Cited

U.S. PATENT DOCUMENTS

| | | | |
|---|---|---|---|
| 5,080,915 A | 1/1992 | Zock | |
| 5,145,699 A * | 9/1992 | Dijkshoorn et al. | 426/94 |
| 5,855,946 A | 1/1999 | Seib et al. | |
| 6,616,960 B2 * | 9/2003 | Peterson et al. | 426/548 |
| 7,618,667 B2 * | 11/2009 | Anfinsen | 426/549 |
| 7,910,150 B2 * | 3/2011 | Matsuda et al. | 426/658 |
| 8,168,244 B2 * | 5/2012 | Bashor | 426/94 |
| 2006/0073239 A1 | 4/2006 | Boyle et al. | |
| 2007/0269569 A1 | 11/2007 | Bashor et al. | |

OTHER PUBLICATIONS

C. W. Brabender, "The Physical Evaluation of Flour Performance", The Bakers Digest (Apr. 1956).

* cited by examiner

*Primary Examiner* — Lien T Tran
(74) *Attorney, Agent, or Firm* — John L. Crimmins; Paul John Parins

(57) ABSTRACT

High fiber-containing pastry products are described. The high fiber-containing pastry products typically comprise about 5-10 grams of fiber in a 54 gram serving of the pastry. The high fiber-containing pastry products comprise a fried laminated dough piece prepared from a developed dough that comprises, inter alia, wheat flour, resistant wheat starch, and vital wheat gluten. The use of a reduced amount of wheat flour along with the addition of resistant wheat starch and vital wheat gluten enables the production of a dough composition that has a high fiber content while retaining desirable organoleptic and processing characteristics.

15 Claims, No Drawings

HIGH FIBER PASTRY PRODUCT

CROSS-REFERENCE TO RELATED APPLICATIONS

This application represents a continuation of U.S. patent application Ser. No. 12/430,924, filed Apr. 28, 2009 now U.S. Pat. No. 8,168,244, which claims the benefit of priority of a provisional patent application, Ser. No. 61/126,122, filed May 1, 2008, which is incorporated herein by reference in its entirety.

BACKGROUND

Frozen consumer-heatable pastry products that contain sweet fillings are well known and include products such as TOASTER STRUDEL brand pastries, and the like. These pastry products are sold to the consumer in frozen form for heating by the consumer in a toaster or microwave oven. Typically, the pastries contain a sweet filing such as a fruit or spice flavored jelly, for example, cherry, cinnamon, apple, and the like. In many instances they often also include icing which may be pre-applied or applied by the consumer after reheating the pastry product. Typically, consumer-reheatable pastry products are low in fiber, for example, containing less than about 1 gram of fiber per 54 gram serving.

With the push for high fiber diets, the reformulation of well-known food products (e.g., consumer-heatable pastry products) to achieve higher levels of dietary fiber is desirable and is an ongoing challenge for food scientists. In many instances, the simple addition of fiber to a food product results in the deterioration of certain desirable organoleptic properties that are associated with the food product. The addition of fiber may also cause significant problems in food processing operations, for example, commercial dough sheeting processes where the rheological properties of the dough may be greatly affected by the addition of dietary fiber.

In view of the foregoing, what is desired is consumer-heatable pastry product that contains a high level of fiber and that maintains desirable organoleptic properties and processing characteristics.

SUMMARY

The invention provides high fiber-containing pastry products. In many embodiments, the high fiber-containing pastry products of the invention comprise about 5-10 grams of fiber in a 54 gram serving of the pastry, more typically ranging from about 8-9 grams fiber in a 54 gram serving of the pastry.

High fiber-containing pastry products of the invention comprise a fried laminated dough piece prepared from a developed dough composition. The developed dough composition comprises, *inter alia*, wheat flour; resistant wheat starch, and vital wheat gluten. It has been found that the reduction of wheat flour content along with the addition of resistant wheat starch and vital wheat gluten enables the production of a dough composition that has a high fiber content while retaining desirable organoleptic and processing characteristics. In particular, it has been found that the addition of resistant wheat starch along with vital wheat gluten allows the developed dough composition to retain its extensibility, thereby allowing it to be successfully sheeted to a desired thickness for use in pastry manufacturing.

In some embodiments, the developed dough composition has an extensibility of about 125-250 mm. In other embodiments, the composition has an extensibility of about 170-220 mm. In some embodiments, the developed dough composition has a maximum resistance (Rmax) of about 300-700 mm. In other embodiments, the developed dough composition has a resistance (Rmax) of about 400-500 mm. Extensibility and maximum resistance can be measured in accordance with Test Procedure 1 described herein.

Pastry product of the invention further includes a sweet filling composition comprising a fiber source selected from the group consisting of inulin, polydextrose, and mixtures thereof. In some embodiments, the sweet filling contributes about 3-4 grams fiber in a 13 gram serving of the sweet filling.

In some embodiments, the pastry product further includes and icing composition that may comprise a fiber source selected from the group consisting of inulin, polydextrose, and mixtures thereof. In some embodiments, the icing composition contributes about 1 gram of dietary fiber in a 6.5 gram serving of the icing.

In some embodiments, the developed dough composition comprises about 30-40% wt. wheat flour; about 15-30% wt. resistant wheat starch; and about 1-3% wt. vital wheat gluten; about 1-3% wt. leavening agent; and about 25-40% wt. water. In some embodiments, the developed dough composition further comprises ascorbic acid for example, at a level ranging from about 0.003-0.008% wt.

DETAILED DESCRIPTION

The invention provides high fiber pastry articles comprising (a) a fried laminated dough piece prepared from a developed dough composition comprising (i) wheat flour; (ii) resistant wheat starch; and (iii) vital wheat gluten; (b) a fiber-containing sweet filling composition comprising a fiber source selected from the group consisting of inulin, polydextrose, and mixtures thereof; and (c) a fiber-containing icing composition comprising a fiber source selected from the group consisting of inulin, polydextrose, and mixtures thereof. In many embodiments, the high fiber pastry articles of the invention comprises about 5-10 grams fiber in a 54 gram serving of the pastry.

The high fiber-containing fried pastry products of the invention are prepared from a developed dough composition comprising wheat flour, water, yeast, resistant wheat starch, vital wheat gluten, fat, and may further include certain option ingredients. Ingredients making up the developed dough composition are described in more detail below.

Wheat Flour

Developed dough compositions suitable for use in the present invention comprise wheat flour. The wheat flour provides a source of protein for the developed dough matrix. In order to provide a high fiber content in the pastry articles of the invention, a portion of the wheat flour that would typically be present in the dough composition is replaced with resistant wheat starch thereby reducing the amount of wheat flour that is present in the dough composition as compared to low fiber dough compositions. Typically, a low fiber dough composition might comprise about 50-60% wt. wheat flour having about 11-13% protein. Typically, the amount of wheat flour present in the dough compositions of the invention ranges from about 30-40% wt., more typically ranging from about 32-36% wt. In an exemplary embodiment, the amount of wheat flour is about 34% wt.

Water

Developed dough compositions suitable for use in the present invention comprise water. The amount of water from all sources (e.g., water, ice, eggs, milk, etc.) should not be so high that the dough composition becomes so soft that it cannot maintain a desired structure, especially a closed-cell structure comprising a developed matrix containing bubbles of carbon dioxide and water vapor. On the other hand, the amount of water should not be so low that the dough composition is dry and has no ability to expand (i.e., no extensibility).

Typically, the amount of water from all sources ranges from about 25-40% wt., more typically ranging from about 31-36% wt. In an exemplary embodiment, the amount of total water is about 33.5% wt.

In many embodiments, the flour/water ratio of the dough composition ranges from about 1.30-2.15, more typically ranging from about 1.65-1.70.

Yeast

Developed dough compositions suitable for use in the present invention are leavened dough compositions that comprise yeast, chemical leavening agents, or a combination thereof.

When yeast is used, it may be typical baker's dry yeast, and can be at a concentration of about 0.5-3% wt. of the dough composition. In certain embodiments of the invention, yeast can be about 1-3% wt. of the dough composition, as well as about 1.0-1.8% wt. of the dough composition. Yeast can be used for leavening, as well as a flavor enhancer to provide better taste.

Chemical leavening agents (i.e., systems with chemical leavening acids and bases) may also be used in the dough compositions of the invention. The chemical leavening system used in preparing the dough products of the invention may include at least one chemical, leavening base. Any chemical leavening base that is capable of undergoing the reaction is suitable for use in the dough product of the invention.

Although a base may be included to react with each chemical leavening acid, i.e., more than one base may be utilized, in an embodiment, the chemical leavening base would be capable of reacting with both of the at least two chemical leavening acids. Such chemical leavening bases are well known to those of skill in the art and, as a result, only the exemplary chemical leavening bases, sodium bicarbonate (baking soda), ammonium bicarbonate and potassium bicarbonate, are recited herein.

The chemical leavening system utilized in the dough products of the invention further may include at least two chemical leavening acids that may be classified as fast acting or slow acting. Suitable fast acting chemical leavening acids for use in the dough products of the invention include, but are not limited to, any of the sodium acid pyrophosphates (SAPP), monocalcium phosphate monohydrate (MCP), sodium aluminum sulfate (SAS), glucono delta lactone (GDL), potassium hydrogen tartrate (cream of tartar), combinations of these and the like.

Suitable slow acting chemical leavening acids include those that have a relatively lower solubility in water and require higher temperatures to react with chemical leavening bases. Consequently, slow acting chemical leavening acids typically react with a chemical leavening base later in the cooking cycle. Slow acting chemical leavening acids that are suitable for use in the dough products of the invention include, but are not limited to, sodium aluminum phosphate (SALP) and dicalcium phosphate (DCP).

In an embodiment of the invention, bicarbonate of soda is used in the dough composition at a concentration of up to about 0.5% wt. of the dough composition. In embodiments of the invention bicarbonate of soda can be powdered and used at a concentration of about 0.2-0.3% wt. of the dough composition.

In an embodiment of the invention, sodium acid pyrophosphate (SAPP) is used in the dough composition at a concentration of up to about 0.5% wt. of the dough composition. In embodiments of the invention, SAPP can be at a concentration of about 0.2-0.3% wt. of the dough composition.

Resistant Starch (RS):

High fiber pastry products of the invention comprise resistant starch ("RS") which replaces a portion of the wheat flour that otherwise typically be present in the dough composition. The resistant starch increases the dietary fiber content of the dough composition. As used herein the term "resistant starch" or "RS" refers to a starch that resists digestion in the small intestine of a human.

Resistant starch is often classified in one of the following four different classifications: RS1, RS2, RS3, or RS4 depending on the cause of its resistance to digestion. RS1 refers to physically inaccessible starch that is due to entrapment of granules within a protein matrix or within a plant cell wall, such as partially milled grain or legumes after cooing. RS2 refers to raw starch granules, such as those from potato or green banana, that resist digestion by alpha-amylase, possibly because those granules lack micropores through their surface. RS3 refers to retrograded amylose formed by heat/moisture treatment of starch or starch foods, such as that that occurs in cooked/cooled potato and corn flake. RS4 refers to chemically modified starches, such as acetylated, hydroxypropylated, or cross-linked starches that resist digestion by alpha-amylase. Some RS4 may not be fermented in the colon.

RS is counted with the dietary fiber fraction of food and is believed to function as fiber in the human digestive tract. When RS reaches the colon it is fermented to hydrogen, methane, carbon dioxide, lactic acid, and short chain fatty acids with purported beneficial effects that suggest prevention of colonic diseases.

In view of the known health benefits of dietary fibers in general, and the potentially advantageous additional properties of RS4 starches in food products, there is a need in the art for improved RS4 starches having a high degree of resistance to alpha-amylase digestion, as well as low-cost methods of producing such chemically modified starches.

In some embodiments, the resistant wheat starch comprises a chemically modified RS4 starch such as the RS4 starch described in U.S. Pat. No. 5,855,946 (Seib et al.). These resistant starches typically exhibit at least about a 20% resistance to alpha-amylase digestion, as measured using American Association of Analytical Chemists (AOAC) Method 992.16 (1995). In some embodiments, the starches have at least about 35% resistance, and most preferably at least about 50% resistance to alpha-amylase digestion using the foregoing method.

A wide variety of native starches can be used in the preparation of the chemically modified RS4 starches, for example, starches taken from the group consisting of the cereal, root, tuber, legume and high amylose starches; specific examples of preferred starches include wheat, corn, oat, rice, tapioca, mung bean and potato starches.

In many embodiments, the RS4 resistant starches are cross-linked, although acetyl, succinyl, and phosphoryl groups may increase alpha-amylase digestion resistance. Cross-linked starches are most preferably phosphorylated to form distarch phosphate diesters and contain at least 0.1% by weight residual phosphorous, and more preferably at least about 0.2% by weight thereof.

These chemically modified RS4 starches are prepared by reacting a starting (usually native and unmodified) starch in the presence of water and with a cross-linking agent under conditions of pH and temperature to yield a modified starch having the desired alpha-amylase digestion properties. The preferred preparation method involves initially forming a slurry of the starting starch in water and adding the cross-linking agent to the slurry. The slurry would typically have from about 15-60% wt. starch, and more preferably from about 30-50% wt. The preferred phosphorylating cross-linker would be sodium trimetaphosphate (STMP) alone or a mixture of STMP and sodium tripolyphosphate (STPP). Preferred reaction conditions include a basic pH (preferably from about 10-13 and more preferably from about 11-12 and a reaction temperature of from about 25-70 C, and more preferably from about 30-50 C. The reaction need be carried out only for a sufficient time to provide the requisite degree of alpha-amylase digestion resistance, and this would normally be for a period of from about 10 minutes to 24 hours, more typically about 1-3 hours.

In many embodiments, the dough composition of the invention comprises about 15-30% wt. resistant starch, for example, about 20-25% wt. resistant starch, or about 23% wt. resistant starch.

Vital Wheat Gluten

In many embodiments, the high fiber-containing pastry products of the invention are prepared from a dough composition that comprises vital wheat gluten. Vital wheat gluten replaces at least a portion of the protein that is lost in the dough compositions due to the reduction of the amount of wheat flour used. Vital wheat gluten refers to the dried, insoluble gluten portion of wheat flour from which the starch and soluble components have been removed by a washing process. Typically, the vital wheat gluten is then dried to a fine powdered state. Vital wheat gluten is typically not denatured as determined by the test procedure in "Approved Methods of the American Association of Cereal Chemist", Method 38 entitled "Vital Wheat Gluten" (December 1962). Vital wheat gluten typically has a percent protein on a dry basis of about 75% or greater. Useful vital wheat gluten is commercially available under the trade designation PROVIM ESP (from Archer Daniels Midland Co., Iowa). Typically, the amount of vital wheat gluten in the dough composition ranges from about 1-3% wt., or from about 1.5-2.5% wt.

Fat

The dough composition may also include fat, which can be added in a variety of formats such as chips, liquids and solids. The fat can also be provided as a roll-in shortening as discussed in more detail herein. A dough fat can be added at a concentration of up to about 15% wt. of the dough composition. In certain embodiments of the invention, dough fat can be about 1-3% wt. of the dough composition.

Optional Ingredients

Optionally, salt can be in a dough composition. Salt is typically added in an amount ranging from about 0.5-2% wt. of the dough composition although other amounts may be useful.

Optionally, an emulsifying agents, such as mono- and diglyceride emulsifiers, may be added to the dough composition. The emulsifying agents are typically used at a concentration of up to about 5% wt. of the dough composition.

Optionally, eggs can be included in the dough composition. The eggs can be used in the form of whole egg solids at a concentration of about 0.5 to about 3.0% by weight of the dough composition. In embodiments of the invention whole egg solids can be at a concentration of about 1.5 to about 2.0% by weight of the dough composition. Egg yolk solids can also be used at a concentration of about 0.5 to about 3.0% by weight of the dough composition as well as about 0.85% by weight of the dough composition.

In many embodiments, the dough composition comprises the following range of ingredients.

TABLE 1

| Ingredient | Amount (Broad Range) (% wt.) | Amount (Narrow Range) (% wt.) |
|---|---|---|
| Wheat Flour | 25-50 | 30-40 |
| Resistant Starch | 15-30 | 20-25 |
| Vital Wheat Gluten | 1-4 | 1-3 |
| Water | 25-40 | 31-36 |
| Fat | 1-10 | 1-3 |
| Yeast | 1.3-2.15 | 1.65-1.70 |

Dough Preparation and Properties

In accordance with the preparation of the mixed dough composition, the wheat flour, resistant starch, vital wheat gluten, eggs, shortening and flavorings heretofore described are dry mixed prior to the addition of water and yeast. After dry mixing, the water and yeast are added, and the ingredients are then full mixed, at a controlled temperature, in order to prevent premature proofing. Typically such a mixer can be one which has a cooling jacket to assure that the temperature is low enough to prevent premature proofing. A second stage mix includes salt, dough conditioners, chemical leavening. During this initial mixing, the dough temperature should not exceed about 66° F. as higher temperatures will result in poor sheeting characteristics and may result in premature proofing. Typically, mixing may be from about three to about 30 minutes, preferably from about 5-10 minutes.

After the dough is mixed and prior to sheeting, the dough composition will typically display an Extensiograph reading of about 125-250 mm, more typically from about 170-220 mm. The dough composition will also typically display a maximum resistance (designated "$R_{max}$") ranging from about 300-700 mm, more typically ranging from about 400-600 mm. If the extensibility is less than about 125 mm, the dough composition will be too stiff and will not stretch enough to holds its shape. If the $R_{max}$ is less than about 300 mm, the strength of the dough composition is not acceptable to hold onto the $CO_2$ gas that is formed during proofing.

The above Extensiograph readings are desirable in order to provide a dough composition that can be sheeted and laminated to a final thickness of about 0.85-2.0 mm, more typically about 1.0-1.5 mm. This results in a finished fried dough product height of about 12-20 mm, more typically ranging from about 13-15 mm. It is preferred that the laminated dough have a thickness not exceeding about 2.0 mm, because it has been found that such a dough is dimensioned such that after expansion during cooking, it will still easily fit within a toaster; and after expansion during toasting, it can still easily be removed from a toaster without becoming stuck.

After the mixed dough composition has been prepared, it is then employed with a hydrated or anhydrous roll-in shortening, with the amount of roll-in shortening utilized being from about 3-20% wt. of the total laminated dough composition after roll-in has occurred, preferably from about 4-10% wt., and most preferably from about 4-7% wt. The total shortening (fat), roll in shortening plus added dough shortening (add in), in the dough should be in the range of between about 4.5-22% wt., preferably between about 6-17% wt., and most preferably between about 6-8% wt. of dough. After frying the total shortening (fat) including that picked up from the frying fat in the cooked dough should be in the range of between about 8-30% wt., preferably between about 12-24% wt., and most preferably between about 12-18% wt. of the cooked dough.

The precise roll-in shortening employed in the roll-in shortening step is not critical. It may be any of the conventional hydrogenated vegetable oil shortenings available on the market, commonly employed in the baking industry. Those are plastic or hydrogenated glyceride shortenings derived most commonly from vegetable oils by hydrogenation. The common oils are cottonseed oil, soybean oil, coconut oil, rapeseed oil, peanut oil, olive oil, palm oil, sunflower seed oil and the like.

Rolling in of the shortening is accomplished in known and available machinery during a sheeting step. Such typical machines may be a Rondo sheeter as well as others.

In many embodiments, the laminated dough, utilizing roll-in shortening at the level hereinbefore described, has from about 2-12 substantially discrete and substantially continuous shortening layers per millimeter of laminated dough thickness. The layers are typically substantially discreet and continuous, in other words, they should be substantially non-broken and extend along the full length of the laminated dough.

After the laminated dough is prepared it is filled with the sweet filling and is folded to form an encasing shell. This process can be referred to as "make up." The make up process may vary but it generally includes dedusting the laminated dough. This step may also comprise brushing off excess flour from the pad surface such as with rotating brush dedusters.

After dedusting, the laminated dough may be docked, followed by slitting to a desired width, and depositing of the sweet filling. A water spray can be applied along the edges of the dough sheet such that good effective sealing and seam integrity are achieved.

The folders and crimpers used in the baking industry are well known. With respect to the product of the type described herein, the laminated dough pad is folded upon itself, laying down the top dough layer after depositing the sweet filling on the bottom dough layer. Folding can be accomplished manually or using mechanical implements such as a dough plow.

Free edges of the product can be finished by, for example, crimping. The folded edge can be crimped to provide all edges with a similar appearance. After crimping, a laminated dough pad having a plurality of discrete and continuous layers, which completely surrounds the filling, is formed.

It has been found desirable to reduce the thickness of the laminated dough pad thickness less than 50% during each pass through the rollers. Attempting to achieve a greater than 50% reduction in laminated dough pad thickness per pass, decreases the ability to obtain discrete and continuous layers in the laminated dough pad. Also, the deducting technique discussed above removes excess flour that might cling to the laminated dough pad and interact with the filling on the inner surface of the dough pad.

Proofing the dough is conducted for a sufficient time to allow a volume increase. This can be done for, about 20-40 minutes, as well as about 20-30 minutes, at conventional proofing conditions such as temperatures of about 110-120° F. and at a relative humidity of about 40-60%. During proofing the product can expand in volume as much as about 80%, with the laminated dough pad itself expanding in volume as much as about 100%. After proofing, the product is ready for cooking, such as by frying or baking.

Constraint on the product can be utilized during cooking to assure that in embodiments intended for heating in a conventional toaster. In such cases a constraint assures that the filled pastry will not expand to a thickness beyond which it will no longer fit within a toaster. For automated processes, the cooking can be done in a double restraint cooker. Typically, the filled pastry is restrained as it passes into the cooker by a lower conveyor screen upon which the filled pastry rests and is also at least partially constrained by an upper conveyor screen. During about the first quarter period of cooking, the product can ride wholly on the lower conveying screen without any upper constraint. Thereafter, as the product moves through the cooker (e.g., fryer), the filled pastry becomes constrained with respect to both the upper conveying screen as well as the lower conveying screen.

Cooking conditions are set to achieve a crisp surface and a moist but not gummy interior. Typically, these results can be achieved by frying at a temperature of about 350-425° F. for about 25-180 seconds. In embodiments of the invention, cooking is at a temperature of about 365-385° F. for about 40-50 seconds, as well as about 375° F. for about 37-43 seconds. Numerous frying oils may be used for frying the filled pastry. Suitable oils include soybean oil or palm oil, for example, from Cargill, Incorporated.

For embodiments intended for heating or toasting in a conventional toaster, the product is conveyed so that immediately after cooking, as the product exits from the cooker, the gap between the constrained conveying screens is slightly decreased to provide a post-cooking thickness of about 13-18 mm. Such a size is especially suitable for placing in a conventional toaster.

After frying, the product can then be frozen and packaged. To enhance the shelf life of the filled pastry, the filled pastry is frozen during distribution and storage prior to consumption. As an alternative to heating the filled pastry in a conventional toaster, it is also possible to heat the filled pastry in other devices such as a microwave oven or a conventional oven.

The filled pastry can be provided in a pastry kit that also includes a topping composition. The topping composition can be prepared from a variety of materials such as diary-based ingredients, icing, fruit, meat, tomato-based sauces, peanut butter, decorative sprinkles, and combinations thereof.

Icing

In many embodiments, the high fiber pastry products of the invention include an icing component that can be pre-applied to the pastry product or may be provided in a separate containing for application to the pastry by the person preparing the pastry. Useful icing compositions comprise sugar, fat, water, sweetener, flavoring, dairy components such as sweet whey solids, xanthan gum, dextrose, and the like. Also a source of dietary fiber that is selected from inulin, polydextrose, and mixtures thereof may be included in the icing composition.

One representative example of a high fiber icing is described in U.S. Patent Application No. 2007/0269569 (Bashor et al.). The high fiber icing composition comprises about 10-15% wt. inulin; about 30-55% wt. sugar; about 0.009-0.027% wt. xanthan gum; about 8-20% wt. water; and about 12-20% wt. total fat. Other ingredients include, for example, corn syrup solids, salt, high fructose corn syrup, flavoring (e.g., vanilla), and polysorbate 60.

Useful fiber-containing icing compositions typically comprise an amount of fiber (inulin, polydextrose, etc.) sufficient to provide about 1 gram of fiber in a serving of icing of about 6.5 grams. For example, the icing may comprise about 10-20% wt. fiber, or about 12-17% wt. fiber.

Filling

In many embodiments, the high fiber pastry products of the invention include a sweet filling that is pre-applied to the pastry product. Typically, the sweet filing comprises a fruit or spice flavored jelly, for example, cherry, cinnamon, apple, and the like. Useful sweet filling compositions comprise sugar, sweeteners, starch, gum blends such as guar and locust bean gum, acidulants, flavors, food color, and preservatives. Also included is a source of dietary fiber that is selected from inulin, polydextrose, and mixture thereof. In an exemplary embodiment, the high fiber pastry products comprise a filling having the formulation shown in TABLE 2.

TABLE 2

| Ingredient | % wt. |
|---|---|
| Water | 36 |
| High fructose corn syrup | 20 |
| Fructalose | 20 |
| Polydextrose | 11 |
| Starch | 7 |
| Strawberries | 3 |
| Citric acid | <1 |
| Strawberry Flavoring | <1 |
| Sodium citrate | <1 |
| Gem Blend SSD 5946 | <1 |
| Sugar | <1 |
| Sodium Benzoate | <1 |
| Potassium Sorbate | <1 |
| Sucralose (25%) | <1 |
| Colorant (Red) | <1 |
| Antifoam | <1 |
| Colorant (Blue) | <1 |

Useful filling compositions comprise an amount of fiber (inulin, polydextrose, etc.) sufficient to provide about 2-5 grams of fiber in a serving of filling of about 13 grams. For example, the sweet filling may comprise about 15-38% wt. fiber, or about 23-30% wt. fiber.

The invention will now be described with reference to the following non-limiting examples.

EXAMPLES

Test Procedure 1: "Extensigraph Test Method"

This procedure is used on dough taken directly from a mixer. The procedure is used to assess the stretching properties of a dough as affected by chemical maturing agents, dough modifiers and other additives which alter the machine-ability of doughs. The method is a modification of AACC method 54-10 especially regarding dough preparation and dough temperature during the determination. The test uses an Extensigraph, Type DM 90-40, C. W. Brabender (Duisburg) instruments equipped with temperature control bath. Obtain a 1000 gram sample directly from the mixer. Avoid further mixing or kneading. Adjust Extensigraph temperature control bath to maintain 60° F. in the fermentation cabinet. Allow dough sample to set at room temperature for 5 minutes from time sample is removed from mixer. Do not work or knead sample during this relaxation period. At end of relaxation time, remove outer dough surface with a scissors. Weigh a 150 gram sample and dust lightly with dusting flour. Transfer sample to the rounder-homogenizer on the Extensigraph and round samples for 20 revolutions. Transfer sample to the dough roller-type moulder and mould into cylinder. Place dough cylinder evenly into dough holder so that all prongs of holder are used and place holder in a cradle within the 60° F. chamber, place the holder with the dough sample on the Extensigraph in position for stretching. Start Kymograph with pen at zero and extend dough until it breaks. Stop downward movement of hook immediately after breaking. Lift pen from chart. From the curve, read and record (1) total extensibility in millimeters; and (2) maximum resistance in Brabender Units (B.U.).

Allow at least one hour for equipment to adjust to temperature the ratio of resistance divided by extensibility characterizes the stability and potential baking volume of the dough. The ratio figures reflect the natural age of the flour and the effects of maturing agents and other dough modifiers. Average results on duplicate samples should agree within +/−10 mm extensibility and +/−50 B.U.'s resistance for different operators using different instruments. See also "The Physical Evaluation of Flour Performance" by C. W. Brabender, The Bakers Digest, April 1956 and AACC Method 55-10, Extensigraph Method, General.

Example 1

A dough composition useful in the present invention was prepared using the ingredients listed in TABLE 3. The dough composition was prepared by first mixing the dry ingredients of $1^{st}$ stage to form a dry blend. Separately, the yeast was pre-hydrated with water. The pre-hydrated yeast, dry ingredient blend, ice, and shortening were then added to a dough mixer and were mixed at low speed. After mixing at low speed, the $2^{nd}$ stage ingredients were added, and the resulting composition was mixed on high speed until the desired Extensigraph reading was reached.

TABLE 3

| INGREDIENT | AMOUNT (% WT.) |
|---|---|
| $1^{st}$ Stage | |
| Flour | 34.17 |
| Resistant Starch | 23.00 |
| Water | 19.78 |
| Ice | 7.19 |
| Yeast Water | 6.56 |
| Yeast | 1.50 |
| Egg Yolk Solids | 0.85 |
| Color | 0.009 |
| Mixer Shortening | 1.20 |
| Vital Wheat Gluten | 2.00 |
| Ascorbic Acid | 0.005 |
| $2^{nd}$ Stage | |
| Sucrose | 1.75 |
| Dextrose | 0.50 |
| Salt | 1.04 |
| SAPP | 0.25 |
| Soda | 0.25 |
| Total | 100.00 |

Comparative Example A

Several fiber sources (e.g., inulin, sugar cane, polydextrose, etc.) were evaluated for use in dough compositions. The results of the evaluations are presented below.

Inulin:

Inulin was evaluated as a fiber source at levels between 15-25% wt. It was found that inulin did not form a dough acceptable for sheeting, laminating, and frying. The product was very sticky and produced a "gummy" product. The inulin dough also became very dark and looked burnt once toasted. A representative inulin formulation is provided in TABLE 4.

TABLE 4

| INGREDIENT | % WT. | % WT. |
|---|---|---|
| FLOUR HARD SPRING (WINTER) | 36.81 | 40.00 |
| WATER | 26.59 | 23.40 |
| YEAST HYDRATION | 7.96 | 7.96 |
| INGREDIENT ICE-POTABLE | 0.00 | 0.00 |
| SHORTENING PALM OIL #2 | 1.20 | 1.20 |

TABLE 4-continued

| INGREDIENT | % WT. | % WT. |
|---|---|---|
| SALT | 1.04 | 1.04 |
| EGG YOLK DRIED FREE FLOWING | 0.85 | 0.85 |
| SODIUM ACID PYROPHOSPHATE (SAP) | 0.25 | 0.25 |
| SODIUM BICARBONATE | 0.25 | 0.25 |
| FDC YELLOW #5 RED #40 MALTODEX | 0.04 | 0.04 |
| POTASSIUM SORBATE SOLUTION-M | 0.0003 | 0.0003 |
| INULIN | 25.00 | 25.00 |

Sugar Cane:

Sugar cane was evaluated as a fiber source at levels between 15-25% wt. The dough made with inulin had a very stiff and brittle dough structure that was not acceptable for sheeting, laminating, and frying. The dough also turned noticeably grey in color and produced an unacceptable texture in the finished product. A representative formula is provided below in TABLE 5.

TABLE 5

| INGREDIENT | % WT. | % WT. |
|---|---|---|
| FLOUR HARD SPRING (WINTER) BL | 36.81 | 40.00 |
| WATER | 26.59 | 23.40 |
| YEAST HYDRATION | 7.96 | 7.96 |
| INGREDIENT ICE-POTABLE | 0.00 | 0.00 |
| SHORTENING PALM OIL #2 | 1.20 | 1.20 |
| SALT | 1.04 | 1.04 |
| EGG YOLK DRIED FREE FLOWING | 0.85 | 0.85 |
| SODIUM ACID PYROPHOSPHATE (SAP | 0.25 | 0.25 |
| SODIUM BICARBONATE | 0.25 | 0.25 |
| FDC YELLOW #5 RED #40 MALTODEX | 0.04 | 0.04 |
| POTASSIUM SORBATE SOLUTION-M | 0.0003 | 0.0003 |
| SUGARCANE FIBER POWDERED | 25.00 | 25.00 |

Polydextrose:

Polydextrose was evaluated as a fiber source at levels between 15-25% wt. Polydextrose did not produce acceptable dough compositions. The mix time to make a dough composition had to be extended to about twice the normal time, and still the dough was not fully developed. The dough structure was very brittle and was very prone to tearing during sheeting. A representative formulation is provided in TABLE 6.

TABLE 6

| INGREDIENT | % WT. | % WT. |
|---|---|---|
| FLOUR HARD SPRING (WINTER) BL | 36.81 | 40.00 |
| WATER | 26.59 | 23.41 |
| YEAST HYDRATION | 7.96 | 7.96 |
| SHORTENING PALM OIL #2 | 1.20 | 1.20 |
| SALT | 1.04 | 1.04 |
| EGG YOLK DRIED FREE FLOWING | 0.85 | 0.85 |
| SODIUM ACID PYROPHOSPHATE (SAP) | 0.25 | 0.25 |
| SODIUM BICARBONATE | 0.25 | 0.25 |
| FDC YELLOW #5 RED #40 MALTODEX | 0.04 | 0.04 |
| POTASSIUM SORBATE SOLUTION-M | 0.0003 | 0.0003 |
| POLYDEXTROSE FCC | 25.00 | 25.00 |

Fiber Combinations:

Blends of various fibers were evaluated. The blends did not make an acceptable finished product because the desired rheological properties were not present. The dough compositions did not sheet acceptably. Representative dough compositions are provided in TABLES 7-8.

TABLE 7

Wheat Starch/Polydextrose:

| INGREDIENT | % WT | % WT. |
|---|---|---|
| FLOUR HARD SPRING (WINTER) BL | 35.81 | 36.81 |
| WATER | 22.61 | 21.61 |
| YEAST HYDRATION | 7.96 | 7.96 |
| SHORTENING PALM OIL #2 | 1.20 | 1.20 |
| SALT | 1.04 | 1.04 |
| EGG YOLK DRIED FREE FLOWING | 0.85 | 0.85 |
| SODIUM ACID PYROPHOSPHATE (SAP) | 0.25 | 0.25 |
| SODIUM BICARBONATE | 0.25 | 0.25 |
| FDC YELLOW #5 RED #40 MALTODEX | 0.04 | 0.04 |
| POTASSIUM SORBATE SOLUTION-M | 0.0003 | 0.0003 |
| WHEAT STARCH HIGH TDF | 15.00 | 15.00 |
| POLYDEXTROSE FCC | 15.00 | 15.00 |

TABLE 8

Wheat Starch/Sugar Cane/Polydextrose:

| INGREDIENT | % WT | % WT |
|---|---|---|
| FLOUR HARD SPRING (WINTER) BL | 36.81 | 37.81 |
| WATER | 23.11 | 22.11 |
| Yeast Hydration | 7.96 | 7.96 |
| SHORTENING PALM OIL #2 | 1.20 | 1.20 |
| SALT | 1.04 | 1.04 |
| EGG YOLK DRIED FREE FLOWING | 0.85 | 0.85 |
| SODIUM ACID PYROPHOSPHATE (SAP) | 0.25 | 0.25 |
| SODIUM BICARBONATE | 0.25 | 0.25 |
| FDC YELLOW #5 RED #40 MALTODEX | 0.04 | 0.04 |
| POTASSIUM SORBATE SOLUTION-M | 0.0003 | 0.0003 |
| WHEAT STARCH HIGH TDF | 9.50 | 9.50 |
| SUGARCANE FIBER POWDERED | 9.50 | 9.50 |
| POLYDEXTROSE FCC | 9.50 | 9.50 |

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A high fiber pastry product comprising:
   (a) a cooked dough piece prepared from a developed dough composition comprising (i) wheat flour present in an amount in the range of from 30 to 40 percent weight; (ii) resistant starch present in an amount in the range of from 15 to 30 percent weight; (iii) vital wheat gluten present in an amount in the range of from 1 to 3 percent weight; (iv) a leavening agent; and (v) water; and
   (b) a sweet filling composition comprising a fiber source selected from the group consisting of inulin, polydextrose, and mixtures thereof, wherein the sweet filling composition is encased within the developed dough composition.

2. The high fiber pastry product of claim 1, wherein the high fiber pastry product further comprises an icing composition on an exterior surface of the dough piece, wherein the icing composition comprises a fiber source selected from the group consisting of inulin, polydextrose, and mixtures thereof.

3. A kit for preparing a high fiber pastry comprising:
   (a) a filled pastry comprising:
      a cooked dough piece prepared from a developed dough composition comprising (i) wheat flour present in an amount in the range of from 30 to 40 percent weight;

(ii) resistant wheat starch present in an amount in the range of from 15 to 30 percent weight; (iii) vital wheat gluten present in an amount in the range of from 1 to 3 percent weight; (iv) a leavening agent; and (v) water;

a fiber-containing sweet filling composition comprising a fiber source selected from the group consisting of inulin, polydextrose, and mixtures thereof, wherein the sweet filling composition is encased within the developed dough composition; and (b) a container holding one or more servings of a fiber-containing icing composition comprising a fiber source selected from the group consisting of inulin, polydextrose, and mixtures thereof.

4. The kit of claim 3, wherein the developed dough composition has an extensibility of about 125-250 mm when measured according to "Extensigraph Test Method".

5. The kit of claim 3, wherein the developed dough composition has a resistance (Rmax) of about 300-700 mm when according to "Extensigraph Test Method".

6. The kit of claim 3, wherein the developed dough composition comprises about 20-28% wt. resistant starch.

7. The kit of claim 6, wherein the resistant starch is an RS4 type resistant starch.

8. The high fiber pastry product of claim 1, wherein the developed dough composition has an extensibility of about 125-250 mm when measured according to "Extensigraph Test Method".

9. The high fiber pastry product of claim 1, wherein the developed dough composition has a resistance (Rmax) of about 300-700 mm when measured according to "Extensigraph Test Method".

10. The high fiber pastry product of claim 1, wherein the developed dough composition comprises about 20-28% wt. resistant starch.

11. The high fiber pastry product of claim 10, wherein the resistant starch is an RS4 type resistant starch.

12. A high fiber pastry comprising a cooked dough piece prepared from a developed dough composition comprising: (i) wheat flour present in an amount in the range of from 30 to 40 percent weight; (ii) resistant starch present in an amount in the range of from 15 to 30 percent weight; (iii) vital wheat gluten present in an amount in the range of from 1 to 3 percent weight; (iv) a leavening agent; and (v) water.

13. The high fiber pastry product of claim 1, wherein the cooked dough piece comprises a fried dough piece.

14. The high fiber pastry product of claim 1, wherein the cooked dough piece comprises a baked dough piece.

15. The high fiber pastry product of claim 1, wherein the cooked dough piece comprises a cooked laminated dough piece.

* * * * *